(12) United States Patent
Iyer et al.

(10) Patent No.: US 11,163,871 B2
(45) Date of Patent: Nov. 2, 2021

(54) CONTROLLING ACCESS TO I/O PORTS BASED ON USER AND SYSTEM CONTEXT

(71) Applicant: Dell Products, L.P., Round Rock, TX (US)

(72) Inventors: Vivek Viswanathan Iyer, Austin, TX (US); Daniel L. Hamlin, Round Rock, TX (US); Minhaj Ahmed, Allen, TX (US)

(73) Assignee: Dell Products, L.P., Round Rock, TX (US)

( * ) Notice: Subject to any disclaimer, the term of this patent is extended or adjusted under 35 U.S.C. 154(b) by 76 days.

(21) Appl. No.: 16/402,015

(22) Filed: May 2, 2019

(65) Prior Publication Data

US 2020/0349251 A1 Nov. 5, 2020

(51) Int. Cl.
| | |
|---|---|
| *G06F 21/00* | (2013.01) |
| *G06F 21/44* | (2013.01) |
| *G06F 9/4401* | (2018.01) |
| *G06F 21/85* | (2013.01) |

(52) U.S. Cl.
CPC ............ *G06F 21/44* (2013.01); *G06F 9/4406* (2013.01); *G06F 21/85* (2013.01)

(58) Field of Classification Search
CPC .... G06F 1/1681; G06F 1/1616; G06F 1/1683; G06F 1/1698; G06F 1/1613; G06F 21/44; G06F 21/554; G06F 21/85; G06F 9/4406
See application file for complete search history.

(56) References Cited

U.S. PATENT DOCUMENTS

| | | | |
|---|---|---|---|
| 2013/0191879 A1* | 7/2013 | Jaber | G06F 21/552 726/1 |
| 2016/0266888 A1* | 9/2016 | Nieves | G06F 8/65 |
| 2018/0004952 A1* | 1/2018 | Samuel | G06F 21/575 |
| 2019/0036563 A1* | 1/2019 | Koshy | H04W 52/267 |
| 2019/0149341 A1* | 5/2019 | Robison | H04L 9/3268 713/156 |

\* cited by examiner

*Primary Examiner* — Ghazal B Shehni
(74) *Attorney, Agent, or Firm* — Fogarty LLP

(57) ABSTRACT

In scenarios where I/O ports of an IHS are not secured, malicious actors may exploit such I/O ports when a user of the IHS is unaware. Embodiments provide techniques for securing access to I/O ports of an IHS based on the context of the IHS, which includes the user context and the system context of the IHS. Upon initialization of the IHS, access to the I/O ports is configured based on a boot context policy. The operating system is booted and use of the IHS proceeds. Modifications to an IHS context are detected. Based on a policy applicable to the modified IHS context, modified access to the I/O ports is configured. In embodiments where the IHS is a convertible laptop, a system context may include the posture in which the system is physically configured. A user context may include whether a user is detected in proximity to the IHS.

20 Claims, 5 Drawing Sheets

CONTROLLING ACCESS TO I/O PORTS BASED ON USER AND SYSTEM CONTEXT

FIELD

This disclosure relates generally to Information Handling Systems (IHSs), and more specifically, to managing secure access to IHS resources.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs may include a variety of I/O (input/output) capabilities by which users may provide inputs to an IHS any by which information may presented to users. In addition, the I/O capabilities of an IHS may support connecting the IHS to external devices and networks. The supported I/O capabilities of an IHS may be implemented using physical I/O ports, such as the external ports supporting cables and cords to be physically coupled to the IHS, and logical I/O ports, such as audio I/O ports that support microphones and speakers of an IHS. Access to such I/O ports provides opportunities for malicious actors to exploit the I/O capabilities of an IHS, including misappropriating information that is available via the IHS.

SUMMARY

In various embodiments, a method is provided for securing access to I/O (Input/Output) ports of an Information Handling System (IHS). The method includes: initializing the IHS; configuring, by an embedded controller of the IHS, access to the I/O ports based on a boot context policy; booting an operating system of the IHS; detecting a modification to an IHS context comprising a user context and a system context; and configuring, by the embedded controller, modified access to the I/O ports based on a policy applicable to the modified IHS context.

In additional method embodiments, the user context comprises an authentication status of a user of the IHS. In additional method embodiments, the user context comprises a detected physical presence of a user in proximity to the IHS. In additional method embodiments, the system context comprises a mode for physically configuring the IHS. In additional method embodiments, the physical configuration mode comprises a mode for using the IHS and a mode for transporting the IHS. In additional method embodiments, the IHS is a convertible laptop supporting a plurality of physical postures and wherein the system context comprises a physical posture of the convertible laptop. In additional method embodiments, the physical posture comprises at least one of a tablet mode, a laptop mode, a tent mode, a landscape mode and a book mode. In additional method embodiments, the I/O ports comprise physical I/O ports and logical I/O ports.

In various additional embodiments, an Information Handling System (IHS) includes a plurality of I/O (Input/Output) ports; a sensor hub comprising a logic unit configured via firmware instructions to determine a user context of the IHS; and an embedded controller comprising a logic unit that is configured by firmware instructions to: configure, upon initialization of the IHS, access to the I/O ports based on a boot context policy; determine a system context of the IHS; detect, upon a booting an operating system of the IHS, a modification to an IHS context comprising the user context and the system context; and configure modified access to the I/O ports based on a policy applicable to the modified IHS context.

In additional IHS embodiments, the user context comprises a detected physical presence of a user in proximity to the IHS. In additional IHS embodiments, the system context comprises a mode for physically configuring the IHS. In additional IHS embodiments, the physical configuration mode comprises a mode for using the IHS and a mode for transporting the IHS. In additional IHS embodiments, the IHS is a convertible laptop supporting a plurality of physical postures and wherein the system context comprises a physical posture of the convertible laptop. In additional IHS embodiments, the physical posture comprises at least one of a tablet mode, a laptop mode, a tent mode, a landscape mode and a book mode. In additional IHS embodiments, the I/O ports comprise physical I/O ports and logical I/O ports.

In various additional embodiments, an embedded controller secures access to I/O (Input/Output) ports of an Information Handling System (IHS). The embedded controller includes a memory having program instructions stored thereon that, upon execution by a logic unit, cause the embedded controller to: configure, upon initialization of the IHS, access to the I/O ports based on a boot context policy; determine a system context of the IHS; determine a user context of the IHS; detect, upon a booting an operating system of the IHS, a modification to an IHS context comprising the user context and the system context; and configure modified access to the I/O ports based on a policy applicable to the modified IHS context.

In additional embedded controller embodiments, the user context comprises a detected physical presence of a user in proximity to the IHS. In additional embedded controller embodiments, the system context comprises modes of physically configuring the IHS for using the IHS and for transporting the IHS. In additional embedded controller embodiments, the IHS is a convertible laptop supporting a plurality of physical postures and wherein the system context comprises a physical posture of the convertible laptop. In additional embedded controller embodiments, the physical posture comprises at least one of a tablet mode, a laptop mode, a tent mode, a landscape mode and a book mode.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
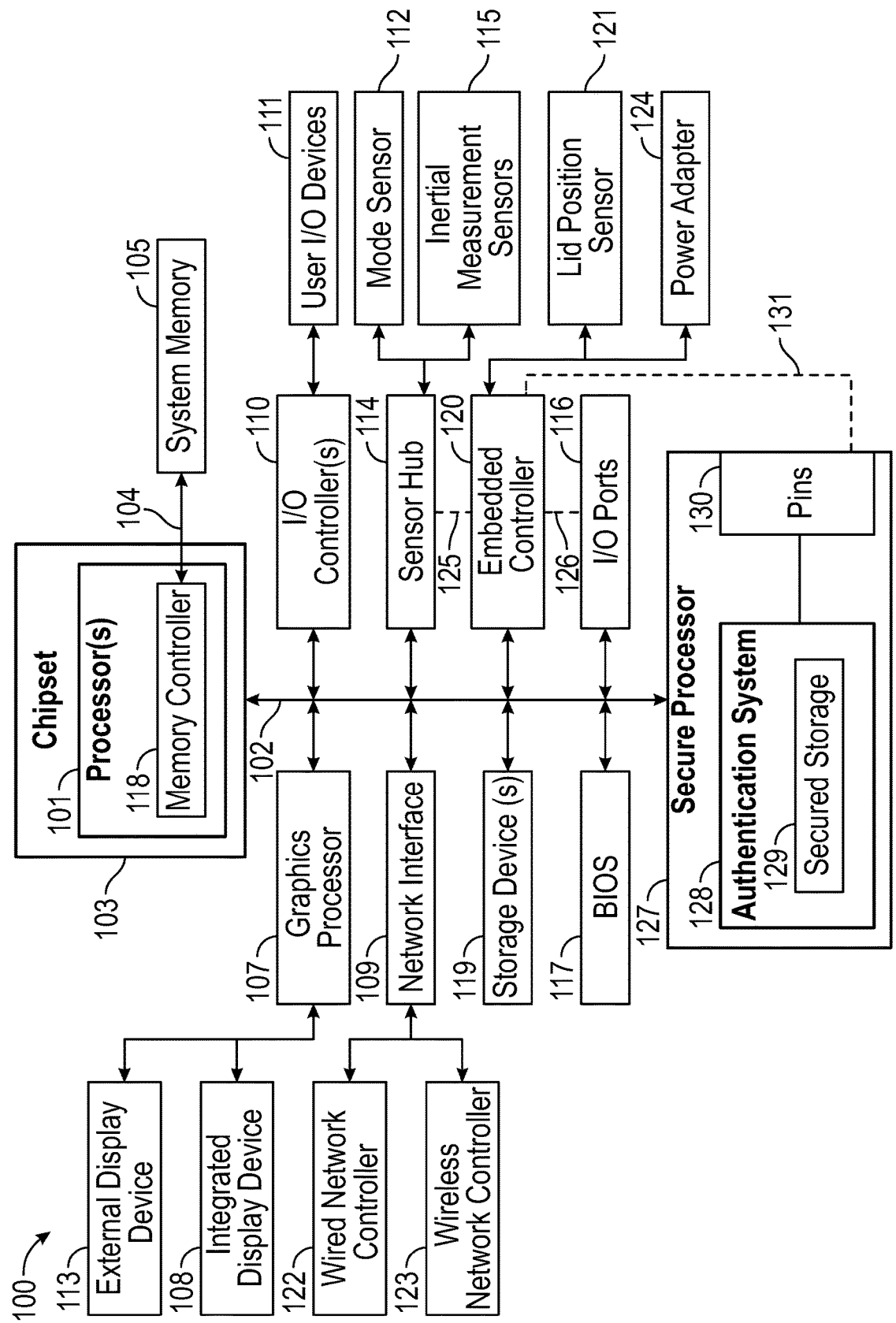
FIG. 1 is a block diagram depicting certain components of an IHS configured according to various embodiments for securing access to I/O ports of the IHS based on user and system context.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

As described, an IHS may support a variety of I/O capabilities, including physical and logical I/O ports that allow a user to provide inputs to the IHS and for the IHS to present outputs for the user. In scenarios where the I/O ports of an IHS are not secured, malicious actors may exploit such I/O ports at times when a user of the IHS is unaware. For instance, while an IHS is unattended, a malicious actor can surreptitiously plug a removeable memory drive into an external port of the IHS and upload files to the IHS and/or download files from the IHS. In another scenario, a malicious actor may seek to access logical I/O ports of an IHS, such as ports used of audio or video, while a user is actively using the IHS, thus capturing audio and images without the user's knowledge. Accordingly, embodiments provide techniques for securing access to such I/O ports of an IHS based on the context of the IHS, which includes the user context and the system context of the IHS.

FIG. 1 is a block diagram illustrating certain components of an IHS 100 configured according to certain embodiments for securing access to I/O ports 116 of the IHS based on user and system context. In various embodiments, IHS 100 may include an embedded controller 120 and a sensor hub 114 that may each execute program instructions that cause each of these components to perform certain of the operations disclosed herein. In certain embodiments, IHS 100 may be configured as a member of an enterprise network by which a variety of computing services may be provided to IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of separate buses to provide the illustrated pathways served by bus 102.

In various embodiments, 100 may include one or more I/O ports 116 the support removeable couplings with various types of peripheral external devices. For instance, I/O 116 ports may include USB (Universal Serial Bus) ports, by which a variety of external devices may be coupled to IHS 100. I/O ports 116 may include various types of physical I/O ports accessible to a user via the enclosure of the IHS 100, where these physical I/O ports support couplings that may connect IHS 100 with external devices and systems, such as couplings established with USB compatible devices via USB ports supported by IHS 100. As described in additional detail below, in various embodiments, each of the supported I/O ports 116 may be secured based on the user context and system context of the operation of IHS 100. For instance, some or all of the I/O ports 116 supported by IHS 100 may be disabled in scenarios where the user context and/or the system context of the IHS 100 indicates that IHS 100 is unattended by an authorized user.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NIC), each of which may implement the hardware required for communicating via a specific networking technology, such as Wi-Fi, BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by the operating system of IHS 100. In certain embodiments, network controllers 122 and/or 123 may utilize network I/O ports for establishing network connections with external systems, where the network I/O ports may be secured as described herein based on the user context and system context of the operation of IHS 100.

Chipset 103 may also provide access to one or more display device(s) 108, 113 via graphics processor 107. In certain embodiments, graphics processor 107 may be comprised within a video card, graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. In some embodiments, power to graphics processor 107, integrated display device 108 and/or external display 133 may be turned off, or configured to operate at minimal power levels, in response to IHS 100 entering a low-power state.

As illustrated, IHS 100 may support an integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to an external I/O port 116 of the IHS 100. In certain embodiments, such external I/O ports that may support an external display 113 may be secured as described herein based on the user context and system context of the operation of IHS 100.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In certain embodiments, the initialization of IHS 100 by BIOS 117 may be paused to allow for the validation of instructions utilized by a trusted component, such as secure processor 127, in order to establish a hardware root of trust in the trusted component that may then be utilized to support certain secure operations of IHS 100, such as user authentication.

In the illustrated embodiment, a secure processor 127 may be a hardware component that has been validated as a trusted resource coupled to IHS 100 and that provides an isolated execution and memory environment for supporting secure operations. In certain embodiments, secure processor 127 may be a component of a system-on-chip that has been configured to implement secure operations of IHS 100. In such embodiments, secure processor 127 may be a component of a removeable, daughter card that is coupled to the motherboard of IHS 100. In certain embodiments, secure processor 127 may be an FPGA (Field Programmable Gate Array) that has been configured to implement the secure management functions, where the instructions utilized by the FPGA are validated using hardware instructions in order to assure the integrity of the described hardware management functions performed by the FPGA. In certain embodiments, the secure processor 127 may an embedded controller that is a motherboard component of IHS 100, where the firmware instructions utilized by the embedded controller are validated using hardware instructions in order to assure the integrity of the described authentication functions.

In certain embodiments, secure processor 127 may operate a secure execution environment that operates based on validated firmware instructions. Via functions provided by the secure execution environment, the secure processor 127 may operate an authentication system 128 that provides the ability to authenticate users requesting access to IHS 100. In certain embodiments, authentication system 128 provides a mechanism for secure user authentication that is independent from the operating system utilized by IHS 100. As illustrated, secure authentication system 128 may utilize an out-of-band communication pathway, such as a GPIO (general-purpose input/output) pins 130 coupled to signal pathways 131, in order to communication user context information to embedded controller 120. In various embodiments, the user context information provided by the secure authentication system 128 may include login status information, such as whether a user is currently logged in or whether the user remains logged in but the IHS 100 is locked, and authentication information indicating the authentication status of the current user of the IHS.

In certain embodiments, chipset 103 may utilize one or more I/O controllers 110 that may each support hardware components such as user I/O devices 111. For instance, I/O controller 110 may provide access to one or more user I/O devices 110 such as a keyboard, mouse, touchpad, touchscreen, microphone, speakers, camera and other input and output devices that may be coupled to IHS 100. Each of the supported user I/O devices 111 may interface with the I/O controller 110 through wired or wireless connections. In certain embodiments, one or more of the I/O devices 111 may be supported via logical I/O ports, such as audio and video ports, that may be secured as described herein based on the user context and system context of the operation of IHS 100.

As illustrated, certain IHS 100 embodiments may utilize a sensor hub 114 capable of determining the relative orientation and movement of IHS 100. For instance, sensor hub 114 may utilize inertial movement sensors 115, that may include accelerometer, gyroscope and magnetometer sensors and are capable of determining the current orientation and movement of IHS 100 (e.g., IHS 100 is motionless on a relatively flat surface or IHS 100 is being moved irregularly and is likely in transport). In certain embodiments, sensor hub 114 may also include capabilities for determining a location and movement of IHS 100 based on triangulation of network signal and based on network information provided by the operating system or a network interface 109. In some embodiments, sensor hub 114 may support additional sensors, such as optical, infrared and sonar sensors, that may provide support for xR (virtual, augmented, mixed reality) sessions hosted by the IHS 100 and may be used by sensor hub 114 provide an indication of a user's presence near IHS 100. As described in additional detail below, such contextual information regarding the operating state of IHS 100 may be utilized to secure access to various logical and physical I/O ports 116.

In embodiments where IHS 100 may support multiple physical configurations, such as the convertible laptop described below with regard to FIGS. 2B and 2C, sensor hub 114 may include a mode sensor 112 capability that provides a determination of the current mode in which the IHS 100 is physically configured. In certain embodiments, such physical mode determinations may be made using the movement and orientation determinations made by the sensor hub 114 using the inertial movement sensors 115. In laptop and convertible laptop embodiments, sensor hub 114 may further utilize a hinge angle sensor to determine the relative angle between the two panels of the laptop in order to determine the mode in which IHS 100 is physically configured.

In certain instances, sensor hub 114 may determine the mode in which a convertible laptop IHS 100 is configured based solely on the angle of rotation of the hinge of IHS 100 from a closed position. For instance, a first range of angles of rotation from a closed position may indicate a laptop configuration, a second range of angles may indicate a landscape configuration and a third range of angles may indicate a tablet configuration. In certain embodiments, the sensor hub 114 may additionally utilize orientation and movement information to determine the mode in which the IHS 100 is physically configured. For instance, if the sensor hub 114 determines the IHS 100 is configured with a hinge angle of a laptop configuration, but the IHS 100 is oriented on its side, the IHS may be determined to be in a book mode. If the IHS 100 is determined to be tiled towards a user's face and is experiencing slight movement, the sensor hub 113 may determine with certainty that the IHS 100 is being used in a book mode configuration. In this manner, the sensor hub 114 may determine that when the IHS 100 is opened such that it lies on a flat surface it is being used in a landscape mode. The sensor hub 114 may similarly determine IHS 100 is in a tent configuration, such as illustrated in FIG. 2C, based on the hinge angle and the orientation where the hinge is pointed upwards. In certain embodiments, such mode determinations made by sensor hub 114 may provide system context that may be utilized to secure access to various logical and physical I/O ports 116 of IHS 100.

In certain embodiments, sensor hub 114 may be an independent microcontroller or other logic unit that is coupled to the motherboard of IHS 100. In such embodiments, sensor hub 114 may communicate with various sensors and chipset 103 of processor 101 via a bus connection such as an Inter-Integrated Circuit (I2C) bus or other suitable type of multi-master bus connection. In certain embodiments, sensor hub 114 may be a component of an integrated system-on-chip incorporated into processor 101 and may utilize an I2C bus for communicating with sensors, such as the mode sensor 112, inertial measurement sensors 115 and sensors used for determining a user's presence near the IHS 100. Sensor hub 114 may collect and processes data from such sensors using data fusion techniques in order to determine contextual information regarding the operational state of IHS 100 for use in securing access to I/O ports of IHS 100.

As illustrated, IHS 100 embodiments may utilize an embedded controller 120 that may be a motherboard component of IHS 100 and may include one or more logic units. In certain embodiments, embedded controller 120 may operate from a separate power plane from the main processors 101 and thus the operating system functions of IHS 100. Firmware instructions utilized by embedded controller 120 may be used to operate a secure execution environment that may include operations for providing various core functions of IHS 100, such as power management, management of operating modes in which IHS 100 may be physically configured (e.g., determining a mode of a convertible laptop IHS based on the current hinge angle of the IHS reported by sensor hub 114) and support for certain integrated I/O functions.

Embedded controller 120 may also implement operations for interfacing with a power adapter 124 in managing power for IHS 100. Such operations may be utilized to determine the power status of IHS 100, such as whether IHS 100 is operating from battery power or is plugged into an AC power source. Embedded controller 120 may also implement operations for detecting any changes to the physical configuration of IHS 100 and managing the modes corresponding to different physical configurations of IHS 100. For instance, in embodiments where IHS 100 is a laptop computer or a convertible laptop computer, embedded controller 120 may receive inputs from a lid position sensor 121 that may detect whether the two sides of the laptop have been latched together to a closed position. In response to lid position sensor 121 detecting latching of the lid of IHS 100, embedded controller 120 may initiate operations for shutting down IHS 100 or placing IHS 100 in a low-power state. In certain embodiments, embedded controller 120 may be configured to place IHS 100 in a low-power state based on various conditions, such as based on a detected period of inactivity. Embedded controller 120 may rely on sensor hub 114 in order to process certain contextual inputs collected by the embedded controller 120 and the sensor hub 114. In some embodiments, embedded controller 120 and sensor hub 114 may communicate during low-power states via an out-of-band signaling pathway 125 that allows the processing of contextual inputs to be shared in various combinations between these two components.

The operations of the secure execution environment of embedded controller 120 may include operations describe herein for use in securing access to the logical and physical I/O ports 116 of IHS 100 based on determined system and user context information. For instance, firmware of embedded controller 120 may include instructions for disabling some or all of the logical and physical I/O ports of IHS 100 immediately upon embedded controller 120 detecting the IHS 100 being initialized. In this manner, embedded controller 120 may configure the I/O ports of IHS 100 in a boot context in which IHS 100 is powered, but the operating system has not yet been booted. In certain embodiments, embedded controller 120 may utilize an out-of-band communication pathway 126 for disabling and enabling I/O ports 116, such as via GPIO pins supported by the I/O ports 116. In this manner, embedded controller 120 may secure access to I/O ports 116 independent of the operating system of IHS 100.

As described in additional detail with regard to the below embodiments, once the operating system of IHS 100 has booted, embedded controller 120 may enable some or all of the I/O ports of IHS 100, where the I/O ports that are enabled may be determined based on system contexts, such as the mode in which IHS 100 is physically configured, and user contexts, such as the login status of an authorized user of IHS 100. During operating operation of IHS 100, embedded controller 120 may detect changes in the user and system context of IHS 100 and may respond by enabling and/or disabling various I/O ports of IHS 100.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
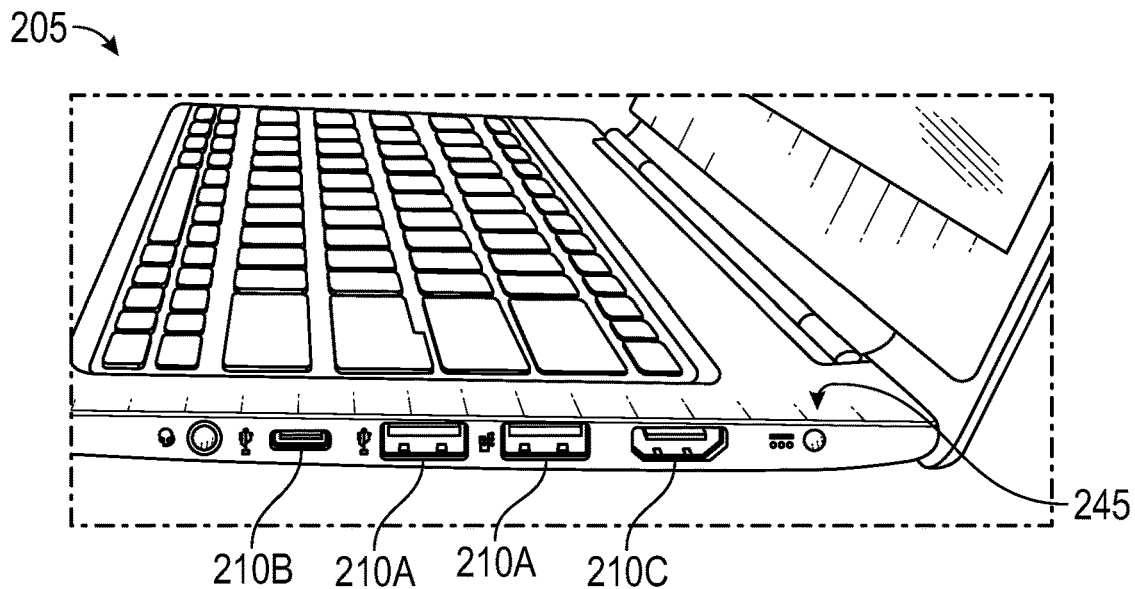
FIG. 2A is an illustration of an IHS that configured according to embodiments for securing access to I/O ports of the IHS based on user and system context.

FIG. 2A is an illustration of an IHS 205 that may be configured according to embodiments for securing access to I/O ports of the IHS 205 based on user and system context. As illustrated, in IHS 205, several external I/O ports 210a-c are located along one edge of the base panel 245 of the IHS 205. These physical I/O ports 210a-c of IHS 205 may include ports such as USB ports (e.g., Type A, Type B, Type C, mini USB, micro USB), HDMI (High-Definition Multimedia Interface) ports, audio jacks, SD (Secure Digital) card slot and/or Ethernet ports. By coupling cables to such I/O ports of IHS 205, users may use IHS 205 to access various external devices and/or networks. Embodiments may secure access to all such physical I/O ports located anywhere on IHS 205. In addition to the physical I/O ports 210a-c illustrated in FIG. 2A, embodiments may also support securing access to logical I/O ports that similarly provide access to external devices and/or networks, such as wireless network ports.

Figure 2B:
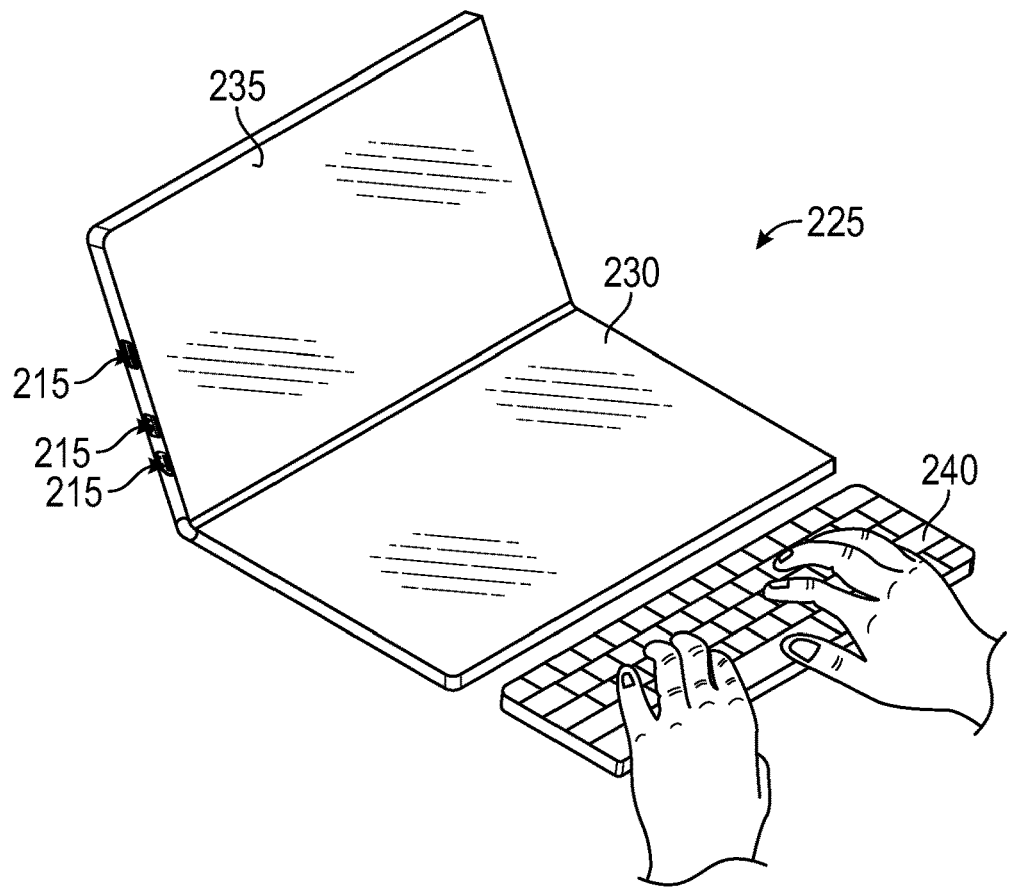
FIG. 2B is an illustration of an IHS configured in a first posture, where the IHS is configured according to embodiments for securing access to I/O ports of the IHS based on user and system context.

FIG. 2B is an illustration of a convertible IHS 225 that may be configured according to embodiments for securing access to I/O ports 215 of the IHS 225, where access to the I/O ports 215 may be secured based on the mode in which convertible IHS 225 is physically configured. The IHS 225 of FIG. 2B is a convertible laptop 225 that supports the panels 230 and 235 being rotated relative to each other about a hinge in order to support a variety of operating modes that may be referred to as postures. As with the laptop of FIG. 2A, the convertible laptop 225 illustrated in FIG. 2B includes two panels 230 and 235. Whereas the illustrated base panel 245 of the laptop of FIG. 2A includes an integrated keyboard, in some embodiments, both panels 230, 235 of the convertible laptop 225 may include integrated displays, one which may display a soft keyboard. In additional, convertible laptop 225 may utilize an external keyboard 240 that may be docked within the laptop 225 or may be used on a tabletop or desk surface, such as illustrated in FIG. 2B.

Figure 2C:
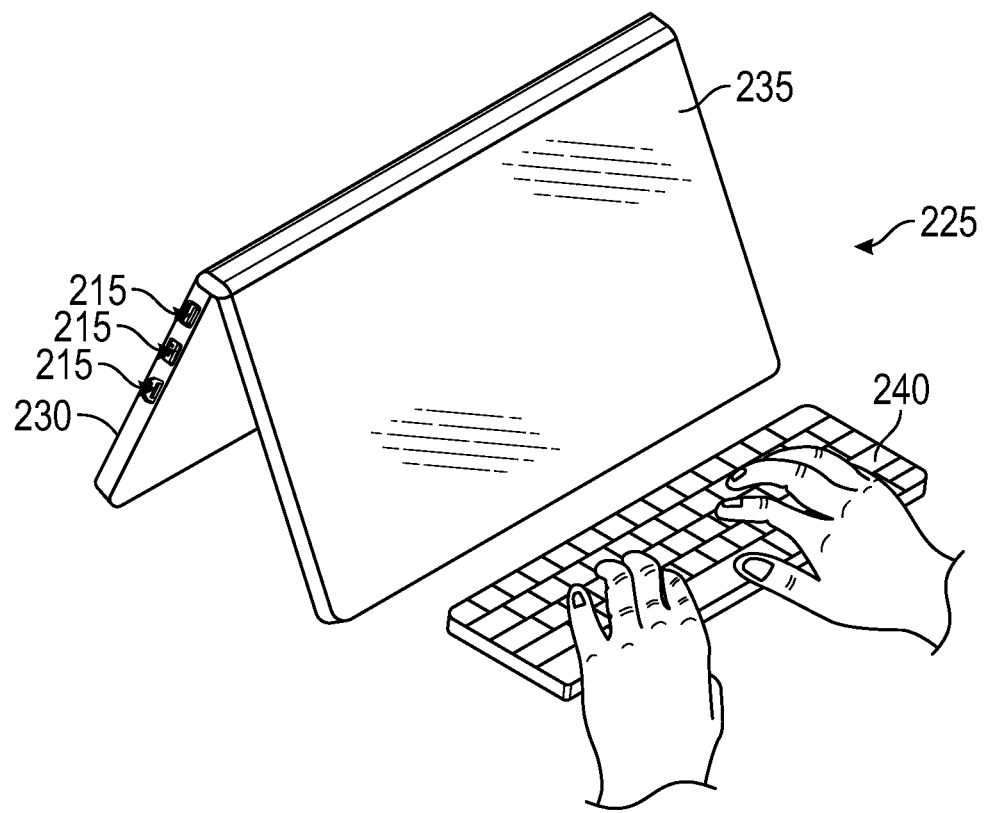
FIG. 2C is an illustration of an IHS configured in a second posture, where the IHS is configured according to embodiments for securing access to I/O ports of the IHS based on user and system context.

FIG. 2C is an illustration of an additional operating posture of the convertible laptop 225 of FIG. 2B. In FIG. 2C, the convertible laptop 225 is propped in a "tent" configuration in which one panel 235 is being used as a display and the other panel 230 is not active. In the tent configuration, the keyboard 240 is used on a tabletop or desk surface in view of the display panel 235. Convertible laptop 225 may be configured in various additional postures. For instance, the panels 230, 235 may be rotated to the fullest extent until configured in a tablet posture in which a display panel is activated and the controls of the other panel are deactivated. In a landscape posture, the panels 230, 235 may be opened 180 degrees such that both displays of a dual-display IHS face the same direction. In a kickstand posture, the IHS rests on one panel that has been disabled the other panel is rotated past 270 degrees such that a display faces the user. In a book posture, the panels are opened less than 180 degrees and the IHS is rotated such that the user is holding the IHS like a conventional book and is able to view dual-display panels.

As illustrated, in the convertible laptop 225 of FIGS. 2B and 2C, the location of the I/O ports 215 relative to the user varies based on the posture in which the convertible laptop 225 is configured. Accordingly, the I/O ports 215 are vulnerable to misuse by malicious actors to varying degrees in these different postures of convertible laptop 225. For instance, in the laptop posture of FIG. 2B, the I/O ports 215 are located within sight of the user typing at keyboard 240. However, in the tent posture of FIG. 2C, the I/O ports 215 may be slightly out of view from the user typing at keyboard 240. Taking advantage of this opportunity, a malicious actor may surreptitiously insert a device, such as a wireless transmitter or a memory device, or a cable to one of the I/O ports 215. In the case of a wireless transmitter, such a device could be inserted into an I/O port 215 while the user is distracted and, due to the small size of certain wireless transmitter devices, the transmitter may remain undetected while the user continues use of the convertible laptop 225. Similar opportunities may present themselves to malicious actors in the various different postures that are supported by an IHS such as convertible laptop 225. Accordingly, embodiments provide a capability for securing such I/O ports 215 based on contextual information regarding the use of an IHS, such as a system context indicating the physical posture in which convertible laptop 225 is presently configured.

Figure 3:
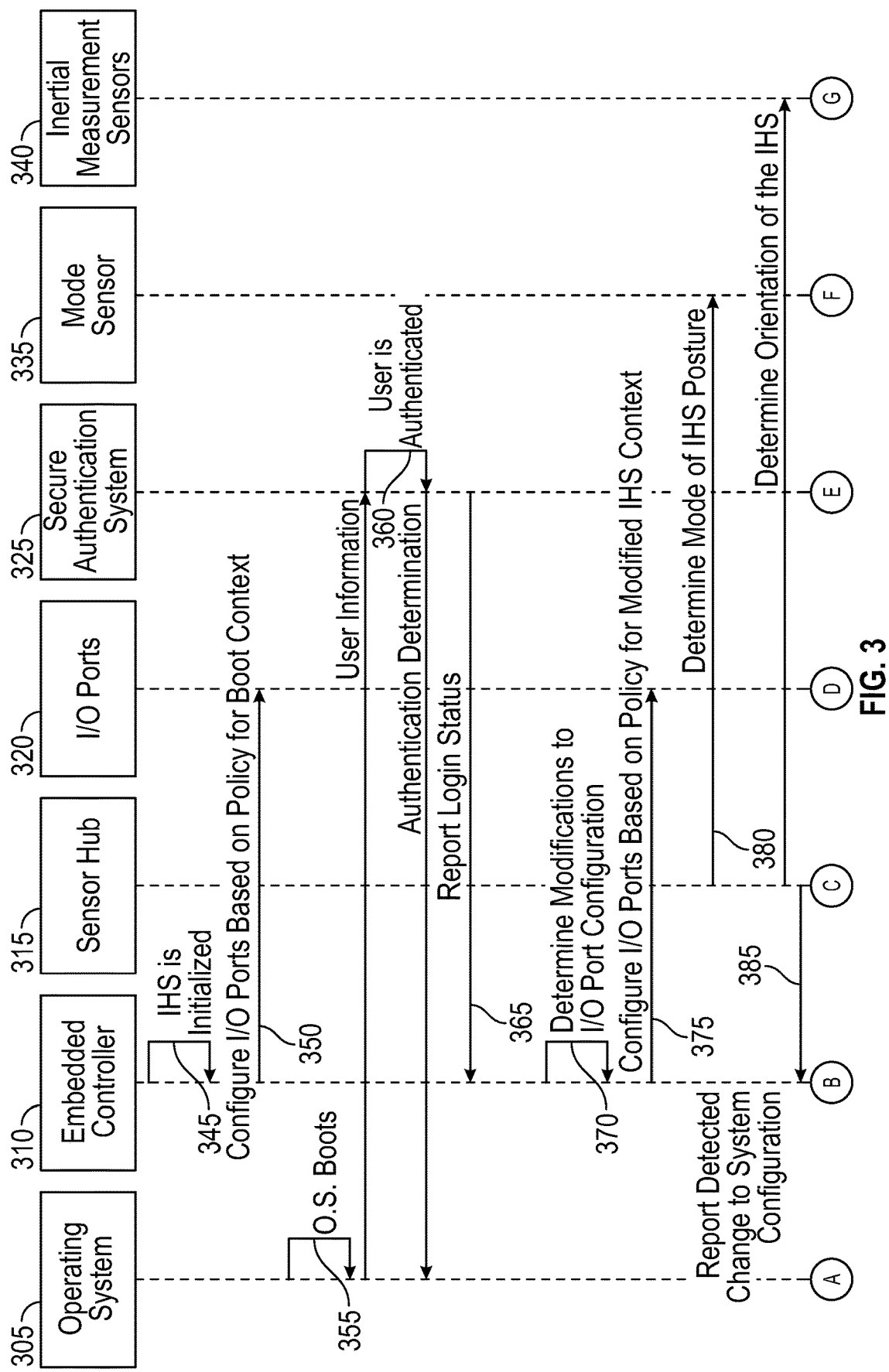
FIG. 3 is a swim lane diagram illustrating certain responsibilities of components of an IHS configured according to certain embodiments for securing access to I/O ports of the IHS based on user and system context.
Figure 3:
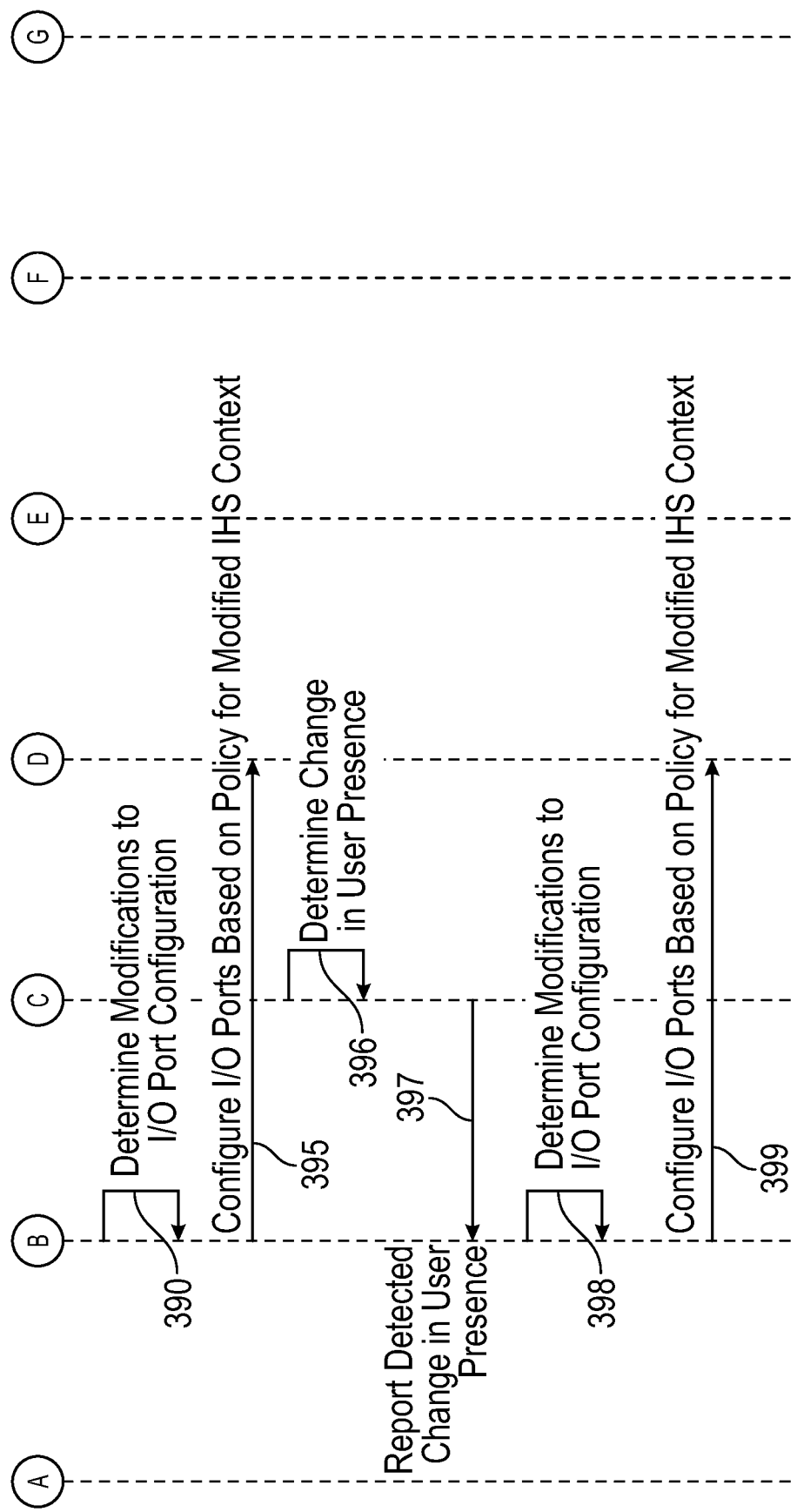

FIG. 3 is a swim lane diagram illustrating certain responsibilities of components of an IHS configured according to certain embodiments for securing access to managed I/O ports 320 of the IHS based on system and user context information. As described, an IHS may include an embedded controller 310 that interfaces directly with the power circuit used by the IHS and may operate on a separate power plane from the main processor of an IHS. Accordingly, in certain embodiments, embedded controller 310 may operate while the main processor of an IHS is in a low-power state and when the operating system 305 of the IHS is not running. As illustrated in FIG. 3, at 345, embedded controller 310 may detect the initialization of an IHS. In certain embodiments, initialization of the IHS from a low-power state or from an off state may be determined through the embedded controller 310 detecting activation of the power circuitry of the IHS in order to commence full power operations of the IHS.

Upon initialization of the power circuitry of the IHS and prior to the booting of the operating system 305, at 350, the embedded controller 310 begins configuring the managed I/O ports 320 of the IHS. In certain embodiments, the embedded controller 310 may configure the managed 320 I/O ports according to a boot context policy that specifies the managed 320 I/O ports that should be disabled or otherwise restricted prior to booting the operating system. As described, embedded controller 310 may utilize out-of-band signaling pathways with certain physical I/O ports of the IHS. Using such out of band signaling pathways, or via buses supported by the IHS, the boot context policy may be utilized by the embedded controller 310 to configure the 320 managed I/O ports. For instance, the embedded controller 310 may signal a USB controller to disable a supported USB port. In other scenarios, embedded controller 310 may disable all or some of the network ports supported by a wired or wireless network controller of the IHS. In this manner, embedded controller 310 may utilize configurations specified in the boot context policy to determine the managed I/O ports 320 that are to be disabled during the initialization of the IHS prior to the loading of the operating system 305.

At 355, the operating system 305 is booted and a prospective user may be prompted for login information. As illustrated, at 360, the operating system 305 may interface with a secure authentication system 325 of the IHS in order to authenticate the prospective user presenting login information. As described with regard to FIG. 1, in certain embodiments, an IHS may utilize a secure authentication system 325 that operates based on instructions validated using a hardware root of trust. With the integrity of the secure authentication system 325 is assured, user information may be transmitted to the secure authentication system 325 where it is utilized to authenticate the prospective user. In certain embodiments, this user information may include a biometric print that has been provided by the prospective user and is compared by the secure authentication system 325 against a library of authenticated prints maintained in a secure storage system.

If the prospective user is authenticated, the operating system 305 may continue certain initializations, such as desktop customizations, that are specific to the authenticated user. Additionally, upon successfully authenticating the user, at 325, the secure authentication system 325 reports the login to the embedded controller 310. In various embodiments, secure authentication system 325 may similarly report other detected changes in the user context, such as a user successfully logging in to resume a locked session or a user being logged out due to inactivity.

In scenarios, where a successfully login has been reported, the embedded controller 310 may determine a user context associated with the user that has been authenticated and is operating the IHS. In certain embodiments, the embedded controller 310 may determine an overall context of the IHS based on the current system context and the updated user context resulting from the login. Based on the current IHS context, the embedded controller 310 may determine an appropriate policy for use in configuring the managed I/O ports 320. If this policy specifies any changes to the current configuration of the managed I/O ports 320, at 375, the embedded controller 310 configures the managed I/O ports 320 based on the updated IHS context. For instance, a login by a guest user may allow use of the IHS, but certain of the managed I/O ports 320, such as USB ports or memory card reader ports, may remain disabled for such users. An authenticated login by a regular user of the IHS, on the other hand, may result in all managed I/O ports 320 be enabled by the embedded controller 375.

As described with regard to FIGS. 2B and 2C, the user may configure certain IHSs, such as a convertible laptop, in various physical postures. As described with regard to FIG. 1, an IHS may utilize a sensor hub 315 that to determine certain aspects of such posture information for an IHS such as a convertible laptop. For instance, at 380, sensor hub 315 may utilize a mode sensor 335 to determine a physical configuration of the IHS, such as by determining the IHS is in a laptop configuration or a tent configuration based on the hinge angle of the two panels of a convertible laptop IHS. In addition, sensor hub 315 may utilize inertial measurement sensors 340 in order to determine a physical orientation of the IHS that may be used to confirm or modify the posture indicated by the hinge angle. For instance, a hinge angle indicting a book mode configuration of an IHS may be confirmed by the sensor hub 315 based on the IHS being oriented on its side and may additionally be tilted towards a user. A hinge angle indicating the IHS is configured in a landscape mode may be confirmed by the sensor hub 315 based on the IHS being oriented with both panels facing upwards while the IHS is on a flat surface. Similarly, a hinge angle indicating a tent mode may be confirmed by the sensor hub 315 based on the IHS being oriented with the hinge propped upwards relative to the two panels.

In other embodiments, various other changes in the system context of the IHS may trigger a change in the applicable policy for configuring access to the managed I/O ports 320. For instance, the sensor hub 315 may also utilize the set of inertial movement sensors 340 determine any movement of the IHS, such as repeated changes in the orientation of the IHS. In some embodiments, the inertial movement sensors 340 may include accelerometer, gyroscope and magnetometer sensors that provide measurements allowing certain aspects of the current use of IHS to be inferred. For instance, the measurements provided by the inertial movement sensor 340 may indicate that the IHS is currently being transported and is unlikely to be in use, in which case the managed I/O ports 320 may be disabled.

In some embodiments, the detected movement of the IHS may be characterized by the sensor hub 315 in order to determine whether the movements would allow the IHS to be used (e.g., such as limited movements that may result from the user holding the IHS in their hands as they walk), or whether the movements would prevent use of the IHS (e.g., such as due to jarring and irregular movements that may result from being carried within a bag). In some scenarios, measurements provided by the inertial movement sensor 340 may also indicate that the IHS is sitting still on a flat surface, thus indicating that IHS could be used in its current position. The measurements provided by the inertial movement sensor 340 may also indicate that the IHS is positioned on its side or upside down such that the IHS is unlikely to be currently in use, in which case the managed I/O ports 320 may be disabled. Upon determining any such changes in the system context, at 385, the sensor hub 315 may report such changes to the embedded controller 310.

In certain embodiments, the embedded controller 310 may also determine various changes in system context that may trigger a change in the applicable policy for configuring the managed I/O ports 320. For instance, the embedded controller 310 may receive indications from a lid sensor whether the lid panel is currently in a closed or open position. For instance, a lid sensor may detect the proximity between magnets located on opposite panel locations of a laptop or a convertible laptop. If the magnets are in close proximity to each other, the opposite panels of the laptop have been folded together such that the laptop is in a closed, or nearly closed, position, in which case the managed I/O ports 320 may be disabled. In certain embodiments, the lid sensor may report whether the panels of a laptop are in a fully closed (i.e., latched) position and may also report whether the panels are effectively closed, even though not fully latched.

Various embodiments may detect additional types of changes in the system context of an IHS. In certain embodiments, embedded controller 310 may obtain information from operating system 305 in detecting such changes. For instance, a change detected by the operating system 305 from use of a private network connection to a public network connection may trigger a change in system context resulting in disabling of certain managed I/O ports 320. Such a policy change may be based on a presumption that use of a public network connection indicates a greater risk of access by a malicious actor. For instance, as described above, when configured in a tent posture, malicious actors may more easily access certain I/O ports of an IHS. Such risks may be considered significantly greater in areas where public networks are in use compared to areas in which private networks are in use.

Similarly, embedded controller 310 may also detect physical movement of an IHS from a secured area, such as a corporate work environment, to an unsecured area such as a public coffee shop. When the IHS is located in a corporate environment, embedded controller 310 may leave managed I/O ports 320 enabled even though the user is not detected in proximity to the IHS. However, in a public environment such as a coffee shop, embedded controller 310 may disable managed I/O ports 320 as soon as the user's presence cannot be verified. In certain embodiments, embedded controller 310 may rely on GPS sensors and information provided by operating system 305 in determining the location of the IHS and a security classification for that location. In certain embodiments, embedded controller 310 may rely on operating system 305 in order to detect, for instance based on monitoring of wireless network signals, whether devices are located in close proximity to the IHS. In such embodiments, certain managed I/O ports 320, such as some wireless networking ports, may be deemed vulnerable and may be disabled in order to prevent any attempts to access the IHS.

In certain embodiments, some changes in the system context such as a change in a connected network, a change in the location of the IHS, or the presence of nearby devices may not result in immediate disabling of managed I/O ports 320, but may instead lower the threshold for disabling of managed I/O ports 320. Such thresholds may be specified by the policy that has been specified for use in a particular user and system context. At 390, based on the detected changes in the system context, the embedded controller 310 may determine an appropriate policy for use in configuring the managed I/O ports 320. If this policy specifies any changes to the current configuration of the managed I/O ports 320, at 395, the embedded controller 310 configures the managed I/O ports 320 based on the policy applicable to the updated IHS context.

Another type of change in user context that may be determined by sensor hub 315 is whether an IHS is unattended, or at least whether a user is detected in proximity to the IHS. In certain embodiments, a sensor hub 315 may utilize various available sensors, at 396, to determine whether a user is detected in proximity to the IHS. As described, an IHS may include various sensors, such as camera, microphone and infrared sensors, that may be utilized to detect a user in proximity to the IHS. Various thresholds may be utilized for determining whether a user is present. For instance, at a lower threshold for determining a user's presence, the sensor hub 315 may determine the currently authenticated user is using IHS as long as a user can be detected in proximity to the IHS. At a higher threshold for determining a user's presence, the sensor hub 315 may determine whether a user is positioned facing a display of the IHS. For instance, the camera sensor may be utilized to detect whether a user's face is present within close proximity to the IHS. At a highest threshold for determining a user's presence, the sensor hub 315 may periodically authenticate a captured face print or voice print, such as using the secure authentication system described with regard to FIG. 1. For instance, the sensor hub 315 may utilize a microphone of the IHS to periodically capture voice prints of individuals near the IHS. If the captured voice prints do not include a print that is verified by the secure authentication system as matching a voice signature of the user that is logged into the IHS, the sensor hub 315 may signal a change in the user's presence.

If a change in the user's presence is detected, at 397 the sensor hub 315 reports the detected change to the embedded controller 310. As above, based on any reported changes in the user context, the embedded controller 310 may determine, at 398, an appropriate policy for use in configuring the managed I/O ports 320. If this policy specifies any changes to the current configuration of the managed I/O ports 320, at 399, the embedded controller 310 configures the managed I/O ports 320 based on the policy applicable to the updated IHS context.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below.

Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for securing access to I/O (Input/Output) ports of an Information Handling System (IHS), the method comprising:
    initializing the IHS;
    configuring, by an embedded controller of the IHS, access to the I/O ports of the IHS based on a boot context policy;
    booting an operating system of the IHS;
    detecting a modification to an IHS context comprising a user context and a system context, wherein the user context comprises an authentication status of a user of the IHS, and wherein the user context further comprises an inability to detect the user's presence within a proximity to the IHS; and
    disabling, by the embedded controller, one or more of the I/O ports in response to a detected modification to the IHS context indicating the presence of the authenticated user is not detected within the proximity to the IHS.

2. The method of claim 1, wherein the system context comprises a location of the IHS, and wherein the one or more I/O ports are disabled in response to a detected modification of the IHS context indicating the authenticated user is not within the proximity to the IHS while the IHS is in a public location.

3. The method of claim 1, wherein the system context comprises a detected physical presence of a device within in the proximity to the IHS.

4. The method of claim 1, wherein the system context comprises a mode for physically configuring the IHS.

5. The method of claim 4, wherein the physical configuration mode comprises a mode for using the IHS and a mode for transporting the IHS.

6. The method of claim 1, wherein the IHS is a convertible laptop supporting a plurality of physical postures and wherein the system context comprises a physical posture of the convertible laptop.

7. The method of claim 6, wherein the physical posture comprises at least one of a tablet mode, a laptop mode, a tent mode, a landscape mode and a book mode.

8. The method of claim 1, wherein the I/O ports comprise physical I/O ports and logical I/O ports.

9. An Information Handling System (IHS), comprising:
    a plurality of I/O (Input/Output) ports;
    a sensor hub comprising a logic unit configured via firmware instructions to determine a user context of the IHS; and
    an embedded controller comprising a logic unit that is configured by firmware instructions to:
        configure, upon initialization of the IHS, access to the I/O ports based on a boot context policy, wherein the access to the I/O ports is configured by the embedded controller prior to booting an operation system of the IHS;
        determine a system context of the IHS;
        detect, upon a booting an operating system of the IHS, a modification to an IHS context comprising the user context and the system context wherein the user context comprises an authentication status of a user of the IHS, and wherein the user context further comprises an inability to detect the user's presence within a proximity to the IHS; and
        disable one or more of the I/O ports in response to a detected modification to the IHS context indicating the presence of the authenticated user is not detected within the proximity to the IHS.

10. The IHS of claim 9, wherein the system context comprises a detected physical presence of a device in the proximity to the IHS.

11. The IHS of claim 9, wherein the system context comprises a mode for physically configuring the IHS.

12. The IHS of claim 11, wherein the physical configuration mode comprises a mode for using the IHS and a mode for transporting the IHS.

13. The IHS of claim 9, wherein the IHS is a convertible laptop supporting a plurality of physical postures and wherein the system context comprises a physical posture of the convertible laptop.

14. The IHS of claim 13, wherein the physical posture comprises at least one of a tablet mode, a laptop mode, a tent mode, a landscape mode and a book mode.

15. The IHS of claim 9, wherein the I/O ports comprise physical I/O ports and logical I/O ports.

16. An embedded controller for securing access to I/O (Input/Output) ports of an Information Handling System (IHS), the embedded controller comprising a memory having program instructions stored thereon that, upon execution by a logic unit, cause the embedded controller to:
    configure, upon initialization of the IHS, access to the I/O ports based on a boot context policy;
    determine a system context of the IHS;
    determine a user context of the IHS, wherein the user context comprises an authentication status of a user of the IHS, and wherein the user context further comprises detecting the user's presence within a proximity to the IHS;
    detect, upon a booting an operating system of the IHS, a modification to an IHS context comprising the user context and the system context; and
    disable one or more of the I/O ports in response to a detected modification to the IHS context indicating the presence of the authenticated user is not detected within the proximity to the IHS.

17. The embedded controller of claim 16, wherein the system context comprises a detected physical presence of a device in the proximity to the IHS.

18. The embedded controller of claim 16, wherein the system context comprises modes of physically configuring the IHS for using the IHS and for transporting the IHS.

19. The embedded controller of claim 16, wherein the IHS is a convertible laptop supporting a plurality of physical postures and wherein the system context comprises a physical posture of the convertible laptop.

20. The embedded controller of claim 19, wherein the physical posture comprises at least one of a tablet mode, a laptop mode, a tent mode, a landscape mode and a book mode.

* * * * *